Oct. 14, 1930. S. G. BLAYLOCK ET AL 1,778,017
PROCESS FOR AND RELATING TO THE SEPARATION OF GOLD,
SILVER, AND LEAD FROM CRUDE ANTIMONIAL METAL
Filed May 3, 1929
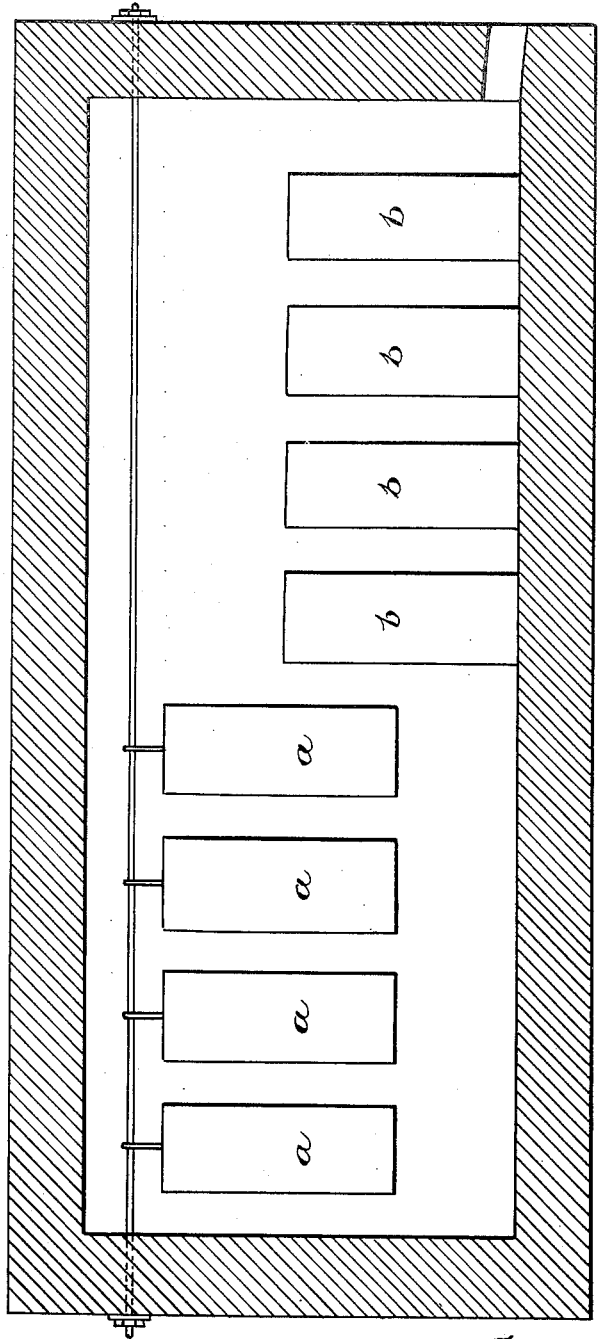
An apparatus suitable for liquating Antimonial Metal.
a a a a are suspended billets and b b b b are billets seated on the bottom of a reverberatory furnace.
Selwyn G. Blaylock
James G. England
Frederick E. Lee
per Chas N Riches
Attorney

UNITED STATES PATENT OFFICE

SELWYN GWILLYM BLAYLOCK, JOHN JAMES FINGLAND, AND FREDERICK ERIC LEE, OF TRAIL, BRITISH COLUMBIA, CANADA, ASSIGNORS TO THE CONSOLIDATED MINING AND SMELTING COMPANY OF CANADA, LIMITED, OF MONTREAL, QUEBEC, CANADA, A CORPORATION OF CANADA

PROCESS FOR AND RELATING TO THE SEPARATION OF GOLD, SILVER, AND LEAD FROM CRUDE ANTIMONIAL METAL

Application filed May 3, 1929, Serial No. 360,301, and in Canada May 21, 1928.

Our invention relates to a process for the recovery of gold, silver, lead, and antimony from crude antimonial metal, substantially free or freed from sulphur, resulting from the reduction of antimony ores, antimony flue dusts and antimonial by-products, and the process comprises:—Heating a charge of the crude antimonial metal to a temperature slightly below its melting point for liquating or sweating from it the contained gold, silver and lead; and maintaining the temperature at a degree where most of the gold, silver, and lead and some of the antimony, pass through and drop from the bottom of the charge; submitting the residue of the charge to a second like treatment for liquating a further portion of the contained gold, silver, and lead when the initial treatment proves incomplete; and remelting and re-casting the liquated metal into billets and submitting them one or several times to a similar treatment, thus fractionating the charge treated into two parts, one comprising the major portion of the contained gold, silver, and lead and some of the antimony, and the other comprising the major portion of the contained antimony, free or substantially free from such metals.

Gold and silver, contained in crude antimonial metal are more readily liquated when associated with specific proportions of lead, and when there is a deficiency of lead in the crude antimonial metal to be treated it is advisable to adjust the proportion of lead to the gold and silver by adding lead until the silver in the crude antimonial metal shall not exceed 2.25% of the contained lead over and above the amount of the latter metal required for the liquation of the gold and the gold in the charge shall not exceed 4% of the contained lead over and above the proportion of the latter metal required for the liquation of the silver.

The presence of lead up to 20% and the presence of arsenic up to 10% of the crude antimonial metal does not interfere with the successful conduct of the process.

The liquation may be conducted at a temperature ranging between 550° C. and 630° C. in a liquation furnace or sweating chamber from which the air can be excluded in great part. A charge of the crude antimonial metal, preferably in the form of a billet, may be conveniently introduced into, and suspended vertically from or supported near the roof of, the sweating chamber, the heat may be gradually increased until the contained metal exudes from the sides and bottom of the charge, and when the maximum temperature is reached the heat conditions may remain constant for a considerable period of time.

The rate of increasing heat should be determined by the proportion of sweated or liquated metal which appears on the sides of the billet, for if this is excessive it is an indication that the temperature is too high, as the best results are secured when the rate of increasing the temperature is such that the sweatings in great part pass through and drop from the bottom of the billet, and only a small proportion appears on the sides of the billet. As the sweating or liquation proceeds, the temperature is raised gradually until the residue of the billet just begins to sag; the operation then being complete.

The residue of the billet is now a porous mass from which the gold, silver, and lead, has been substantially removed, together with some of the antimony. When the charge is supported by the bottom, the liquation may be hindered or retarded in the lowest portion of the billet, and in that case it may be necessary to remove and retreat the bottom 2″ or 3″ or the entire residue, either alone or with the succeeding charge of the original crude metal or with the sweatings, according to the proportion of contained gold, silver, and lead. The final residual billets substantially free from gold, silver, and lead are treated by known refining methods for the preparation of market antimony. The sweatings may be recast into billets and submitted to a second treatment or successive treatments as above outlined, to recover a further portion of the contained antimony in a state ready for refining, and, to concentrate the gold, silver, and lead into a smaller fraction of the original charge of antimonial metal treated. The final liquated or sweated metal from each treatment or the several treatments is then in condition to effect the recovery of the gold, silver, and lead by known metallurgical methods.

An apparatus suitable for carrying out this method or process is shown in the accompanying drawing and may comprise any suitable type of externally heated liquation furnace or sweating chamber from which the air can be mainly excluded and into which the charge of crude antimonial metal may be introduced and suspended vertically or otherwise supported in it, and may also comprise a receptacle for collecting the exuded metal.

A trial experiment of about 71 tons of crude metallic antimony containing 9.3% arsenic, according to the procedure outlined, gave the following results:—

|  | Tons | Ozs. ag. | Lbs. pb. |
| --- | --- | --- | --- |
| Drip produced | 20 | 2,610 | 2,550 |
| Residual antimony metal | 43 | 1,170 | 2,680 |
| Initial metal charge | 71 | 3,787 | 5,250 |

A trial experiment on crude antimony metal, the arsenic content of which had been eliminated by a preliminary treatment, gave the following results:—

|  | Tons | Ozs. ag. | Lbs. pb. |
| --- | --- | --- | --- |
| Drip produced | 0.70 | 115 | 265 |
| Residual antimony metal | 2.86 | 98 | 267 |
| Initial metal charge | 3.91 | 217 | 552 |

Having thus fully described our invention, what we claim as new and desire to secure by Letters Patent is:

1. A process for separating gold, silver, lead, and antimony, from crude antimonial metal substantially free from sulphur, resulting from the reduction of antimony ores, antimony flue dusts and antimonial by-products, which comprises heating a charge of the crude antimonial metal to a temperature slightly below its melting point and maintaining the temperature at a degree where most of the contained gold, silver, and lead, and some of the antimony pass through and drop from the bottom of the charge, thus fractionating the crude metal treated into two parts, one comprising the major portion of the contained antimony and the other comprising the major portion of the contained gold, silver, and lead.

2. A process for separating gold, silver, lead, and antimony, from crude antimonial metal, substantially free from sulphur, resulting from the reduction of antimony ores, antimony flue dusts and antimonial by-products, which comprises heating a charge of the crude antimonial metal to a temperature slightly below its melting point for liquating the contained gold, silver, and lead and maintaining the temperature at a degree where most of the gold, silver, and lead, and some of the antimony, pass through and drop from the bottom of the charge, submitting the residue of the charge to a second like treatment for liquating a further portion of the contained gold, silver, and lead when the initial treatment proves incomplete, submitting the liquated metal to a further similar treatment, thus fractionating the crude antimonial metal treated into two parts, one comprising the major portion of the contained antimony and the other comprising the major portion of the gold, silver and lead.

3. A process for separating gold, silver, lead and antimony, from crude antimonial metal substantially free from sulphur, resulting from the reduction of antimony ores, antimony flue dusts and antimonial by-products, which comprises adding sufficient lead to the crude antimonial metal until the contained silver shall not exceed 2.25% of the lead over and above that required for the gold, and the contained gold shall not exceed 4% of the lead over and above the lead required for the silver, heating a charge of the crude antimonial metal to a temperature slightly below its melting point for liquating the gold, silver and lead, and maintaining the temperature at a degree where most of the gold, silver and lead, together with some of the antimony, passes through and drops from the bottom of the charge, thus fractionating the crude antimonial metal treated into two parts, one comprising the major portion of the contained antimony, and the other comprising the major portion of the contained gold, silver and lead.

4. A process for separating gold, silver, lead, and antimony, from crude antimonial metal substantially free from sulphur, resulting from the reduction of antimony ores, antimony flue dusts and antimonial by-products, which comprises adding sufficient lead to the crude antimonial metal until the contained silver shall not exceed 2.25% of the lead over and above that required for the gold, and the contained gold shall not exceed 4% of the lead over and above that required for the silver, heating a charge of the crude antimonial metal to a temperature slightly below its melting point for liquating the contained gold, silver and lead, maintaining the temperature at a degree where most of the gold, silver, and lead, together with some of the antimony, passes through and drops from the bottom of the charge, submitting the residue of the charge to a further like treatment for liquating a further portion of the contained gold, silver, and lead when the initial treatment proves incomplete, and submitting the liquated metal to further similar treatment, thus fractionating the crude antimonial metal into two parts, one comprising the major portion of the contained antimony, and the other comprising the major portion of the contained gold, silver, and lead.

Dated at the city of Trail, in the District of Kootenay, and Province of British Columbia, this seventh day of March, 1929.

SELWYN GWILLYM BLAYLOCK.
JOHN JAMES FINGLAND.
FREDERICK ERIC LEE.